June 4, 1940.  C. R. HUBBARD  2,202,908
MACHINERY PACKING
Filed Oct. 22, 1938

INVENTOR
Cecil R. Hubbard,
BY
Fraser, Myers & Manley,
ATTORNEYS.

Patented June 4, 1940

2,202,908

UNITED STATES PATENT OFFICE 2,202,908

MACHINERY PACKING

Cecil R. Hubbard, Palmyra, N. Y., assignor to The Garlock Packing Company, Palmyra, N. Y., a corporation of New York Application October 22, 1938, Serial No. 236,382

19 Claims. (Cl. 288—3)

This invention relates to improved means for sealing an orifice between a pair of relatively movable machine elements. The principal object of the invention is to provide such a sealing means which comprises an assembly of elements adapted to have a floating movement as a unit in accordance with relative movements of the machine members other than their normal relative movements while constantly maintaining a seal of the orifice intervening between the machine elements.

The form of the invention which has been selected for purposes of illustration is adapted for use as a compound sealing gasket for a journal bearing such as might be relied upon to effectively prevent the escape of a lubricant from the bearing and also exclude dust, moisture, etc.

The disclosed oil seal is of a form adapted to surround and be held in a sealing relation with the journal, the elements of the sealing device being housed within a surrounding channeled element in spaced relation with, and having its entrance facing, the outer surface of the said journal.

Although in the disclosed embodiment the channeled element of the sealing device is represented as a housing consisting of two parts secured together, within which the assembly of sealing elements may be installed and the entire structure mounted as a unit in fluid-tight engagement with the machine element which surrounds the journal, the invention is not limited to such a specific construction as compared with one of which the channel for the sealing assembly might be formed in part or altogether by one or more of the elements of the journal bearing surrounding the journal.

It is, of course, not intended that the invention be in any manner limited to the specific form which has been selected for purposes of illustration. It may be designed to serve equally well whether the relative movement of the machine elements is rotational or reciprocatory. It is of no consequence whether it be the inner element or the outer element which is stationary. It is a mere matter of election on the part of the designer whether the channeled element be a part of a surrounded inner machine element or a part of an element which surrounds an inner element. It is not essential that the channel be one which faces either inwardly or outwardly, as distinguished from one which is recessed laterally with reference to a plane surface of one of the machine elements and faces a spaced plane surface of another machine element, in which case the floating properties of the sealing assembly would be of importance as a means of providing for slight unintended axial movements of a journal in its bearing, as distinguished from movements other than the intended rotational movements about a common axis due to a whipping or lack of adjustment of the parts of the journal bearing when the sealing assembly is used to close an annular orifice between concentrically mounted cylindrical structures.

It is not even essential that the machine elements be of circular form in cross section, as distinguished from elements of other forms which might be resorted to if the relative movements between the machine elements are reciprocal rather than rotary.

Of the drawing, illustrating a preferred form of the invention,

Figure 1:
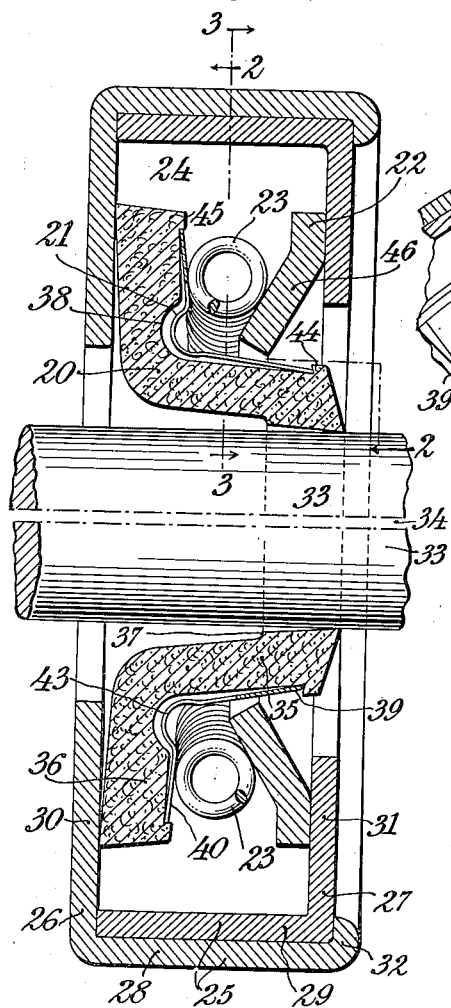
Figure 1 is an axial sectional view of the sealing device assembled with a journal which is represented in elevation.
Figure 2:
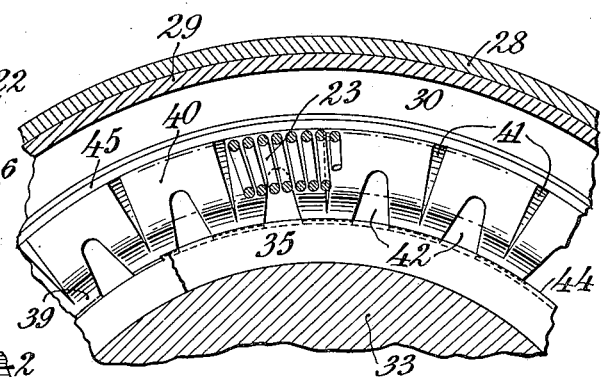
Fig. 2 is a fragmentary sectional view of parts of the sealing device, the plane of section being taken perpendicularly to the axis of the journal along the line 2—2 of Fig. 1, the parts being represented as viewed in the direction indicated by arrows.
Figure 3:
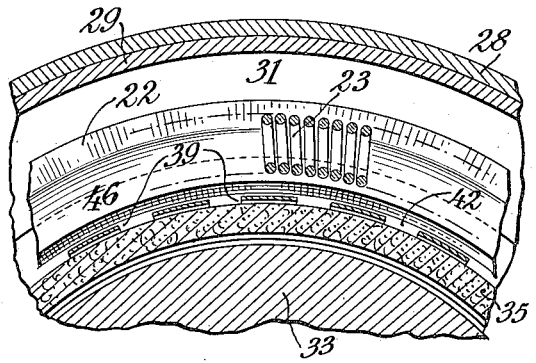
Fig. 3 is a fragmentary sectional view of parts of the sealing device, the plane of section being taken perpendicularly to the axis of the journal along the line 3—3 of Fig. 1, the parts being represented as viewed in the direction indicated by arrows.

The form of the invention illustrated by the above-described drawing, Figs. 1, 2 and 3, comprises, in general, a flexible sealing element 20, a resilient expander 21 assembled with the flexible element, a rigid sliding ring or shoe 22, and a resilient separating ring in the form of a garter spring 23, the four rings being assembled as a unit in an inwardly directed channel 24 of a housing 25, which in the specific form illustrated comprises a pair of rings 26, 27, of angular form in cross section, said rings having cylindrical flanges 28, 29, telescoped one within the other, and inwardly directed radial flanges 30, 31 at the opposite margins of the cylindrical flanges so as to form the end closures for the channel 24. The rings 26, 27 of the housing 25 may be firmly secured to each other, so as to provide a rigid unitary housing member, by rolling or peening the free margin of the flange 28, which is made slightly wider than the flange 29 for such purpose, over the adjacent portion of the ring 27, as indicated at 32.

The parts of the sealing device thus far generally described are of dimensions such as to surround a journal bearing 33 with the inner surface of the flexible sealing ring 20 in contact with the outer surface of the bearing.

As illustrated in Fig. 1, the upper and lower portions only of the journal bearing are shown, the intermediate portion being represented as having been cut away at 34.

The flexible sealing ring 20 may be of angular form in cross section such as to comprise a substantially cylindrical flange 35 and a substantially radial or outwardly disposed flange 36 at one margin of the cylindrical flange. Preferably the flange 35 will be slightly flared inwardly toward its free margin, and may also, if desired, have an annular zone adjacent the free margin slightly offset as at 37 so as to make actual contact with the journal only throughout an annular surface of relatively narrow width immediately adjacent the free margin.

The radial flange 36 may also, if desired, be gradually flared toward the flange 30 of the housing from its innermost part outwardly, so as to have contact with the inner surface of the flange only throughout a relatively narrow annular zone just within its free margin.

As a means of increasing the flexibility of each of the flanges 35, 36 of the flexible sealing ring, each with respect to the other, the inner surface of the ring 20 may be recessed or channeled as at 38 along the annular zone within the reentrant angle of the sealing ring where the surfaces of the two flanges approach each other.

The resilient ring 21 may be of angular form approximating that of the flexible sealing ring so as to have corresponding flanges 39 and 40. These flanges may, if desired, be flared in the same directions and to a slightly greater extent than are the adjacent surfaces of the flanges 35 and 36 of the sealing ring, as indicated, so as to have contact with the flanges of the sealing ring only along zones of relatively narrow width just within the free margins of the flanges of the resilient ring.

Preferably the flanges of the resilient ring will be severed at spaced intervals along their free margins as indicated at 41 and 42, Fig. 2, in order to increase their flexibility, and, if desired, the flexibility of the resilient ring may be slightly increased by rounding the annular portion at the junction of the two flanges as indicated at 43, thus causing the rounded portion to extend into the recess 38 of the flexible sealing ring.

As a means of maintaining the sealing ring and its resilient ring in their assembled relations irrespective of other holding means, the flanges of the sealing ring may be of dimensions such as to extend slightly beyond the free margins of the resilient ring, and may be provided with marginal shoulders 44, 45, disposed in abutting relations with respect to the margins of the resilient ring so as to hold the two rings in a readily detachable, assembled relation.

The dimensions of the resilient ring should be such that, when assembled with other parts of the sealing device, it will be held flexed with its angular dimensions, compared with its dimensions when free and as measured within its reentrant angle, reduced so that the flanges will tend to move in a direction such as to increase that angle and thereby cause them to exert a constant pressure against the opposed surfaces of the flanges of the sealing ring.

It is not at all essential that the resilient ring 21 be an endless structure. It may, for example, be made from rectilinear, ribbon-like stock pressed to the appropriate angular form in cross section, severed inwardly at spaced intervals from the free margins of its flanges, and then cut to lengths corresponding with the annular dimensions of the sealing rings with which it is to be used. The inserted resilient ring will be held in its assembled relation with the sealing ring by the shoulders 44, 45, even though the ends of the resilient ring are not secured together.

The annular ring or shoe 22 may be provided with an inwardly directed extension 46, having its free inner margin facing, but in spaced relation with, the outer surface of the flange 39 of the resilient ring which surrounds the flange 35 of the sealing ring. This inwardly directed extension of the shoe will preferably be flared inwardly toward the opposed surface of the flange 40 of the resilient ring which makes contact with the flange 36 of the sealing ring.

The dimensions of the sealing ring 20, the resilient ring 21, the shoe 22 and the garter spring 23 should be such that the garter spring may be held under tension between inwardly flaring walls provided by inwardly flared surfaces of the flange 40 of the resilient ring and extension 46 of the shoe, so that the garter spring may serve as a separator tending to move the flange 36 and associated flange 40 of the sealing ring and resilient ring in one direction and the opposed shoe 22 in the opposite direction and hold the outer surface of the flange 36 and the outer surface of the shoe in snug sliding contact with the inner surfaces of the flanges 30 and 31 of the housing.

If the sealing device is one intended to prevent the escape of oil from a bearing, it will be mounted with the free margin of the flange 35 of the sealing element directed toward the chamber within which it is designed to retain the lubricant. On the other hand, if the sealing device is to be relied upon to prevent the entrance of air, moisture, dust or other refuse, to a chamber which is to be subjected to a partial vacuum, the free margin of the flange 35 of the sealing element will be directed away from the chamber in which the pressure is to be reduced. In general, the free margin 35 of the sealing element will be so mounted as to face in the direction from which the flow of fluid or liquid is to be intercepted.

Any desired degree of pressure between the flange 36 of the sealing ring and the flange 30 of the housing, and between the shoe 22 and flange 31 of the housing, within reasonable limits, may be attained by properly dimensioning the garter spring 23 and the parts between which it is mounted, and by appropriately forming the flanges of the sealing ring and its associated resilient ring and the extension 46 of the shoe, any one or more of which may be flared to any desired degree dependent upon the results to be attained.

The inner margins of the flanges 30, 31 of the housing should be spaced from the outer surface of the journal 33 to an extent such as to provide for any deviation of the journal from its proper axial position either as a result of any faulty adjustment of the journal bearing or as a result of a whipping action when run at high velocity.

From the foregoing description it will be apparent that the sealing ring 20, its assembled resilient ring 21, the shoe 22, and the garter spring 23 are so related as to constitute a floating assembly of elements which are free to move as a unit between the inner walls of the channel of the housing in accordance with any movements of the journal other than its intended rotary movement about its axis.

If, as in the specific form of the invention herein disclosed, the proportions of the parts of the various elements are as illustrated, the outwardly directed flange of the resilient ring 21 will be interposed between the garter spring 23 and the flange 36 of the sealing element so that the garter spring will serve as a means of maintaining the sealing ring and its resilient ring in their assembled relation.

Variations which might have to be resorted to as to the relative forms and proportions of parts of the sealing device, in order to meet requirements with which the designer may be confronted, as, for example, when it is desired to have the channel mounted upon the journal, instead of within the housing for the journal; or when the journal is intended to be the stationary element and the element which surrounds the journal is to rotate; or when it is desired to mount the floating assembly in a channel forming a lateral recess in a surface perpendicular to the axes of the relatively movable machine elements with a sealing element to be held in contact with an opposed surface also perpendicular to the axes of said elements and in spaced relation with, but facing the entrance to, the channel; or when the channel in which the floating assembly is to be mounted is in part or even entirely formed by one or more parts of one of the machine elements with which the sealing device is to be assembled, instead of being provided with a separately constructed housing to be mounted in the machine element, will be obvious to one skilled in the art.

As should be clearly apparent from the foregoing description, the invention to be protected is intended to include all of the conceivable modifications and variations of the many forms herein specifically or generally disclosed within the scope of the appended claims.

What is claimed is:

1. An improved means for sealing an orifice between parts of a pair of relatively movable machine elements, comprising a channeled portion of one and an opposed surface portion of the other; the said sealing means comprising a floating assembly of elements including a flexible sealing element of angular form in cross section having one of its flanges adapted to lie along the surface portion of one of the machine elements which faces the channel and its other flange adapted to be held in sliding contact with one of the two inner, oppositely disposed surfaces of the channel; resilient means held in a state of flection in yielding engagement with the otherwise exposed marginal portions of said flanges to maintain them in effective sealing relation with the parts with which they make contact; a rigid shoe adapted to be held in sliding contact with the other of the said oppositely disposed surfaces of the channel, the shoe and the sealing element, including the resilient means associated therewith, being of forms and dimensions such as to provide an intervening crevice having opposed walls each so inclined towards the other as to gradually diminish its breadth at increasing distances from the closed base wall of the channel; and resilient spacing means in the crevice adapted to yieldably maintain the sealing element and the shoe in snug sliding contact with the said oppositely disposed inner surfaces of the channel.

2. Improved sealing means, as defined by claim 1, including mutually engaging marginal elements separate from and independent of the resilient spacing means of the floating assembly, for maintaining the sealing element and its associated resilient means assembled with each other in their effective cooperative relation.

3. Improved sealing means, as defined by claim 1, of which the resilient means associated with the marginal portions of the flexible sealing element is extended along one of its margins so as to be interposed between the resilient spacing means and the adjacent flange of the sealing element, whereby the separator may serve as a means for maintaining the sealing element and its associated resilient means in their assembled relation.

4. Improved sealing means, as defined by claim 1, of which the flange of the sealing element, which is adapted to have contact with a surface of the channel in which the floating assembly is designed to be housed, is gently flared in a direction such as to have contact with the said surface only along a zone of relatively narrow width adjacent the free margin of the flange.

5. Improved sealing means, as defined by claim 1, of which the flange of the sealing element which is adapted to lie along the surface of the machine element facing the channel is offset so as to have contact with the said surface only along a zone of relatively narrow width adjacent the free margin of the flange.

6. Improved sealing means, as defined by claim 1, of which that part of the resilient means, associated with the sealing element, which has contact with the flange intended to be opposed by a surface of the channel, is a flange adapted to lie along the surface of the said flange of the sealing element, the said flange of the resilient element being gently flared in a direction such as to have contact with the said flange of the sealing element only along a zone of relatively narrow width adjacent its margin and serve as one of the inclined walls of the crevice between the shoe and the sealing element.

7. Improved sealing means, as defined by claim 1, of which that part of the resilient means, associated with the sealing element, which has contact with the flange intended to be opposed by the surface of the machine element facing the channel, is a flange adapted to lie along the surface of the said flange of the sealing element, the said flange of the resilient element being severed at spaced intervals along its margin to form a succession of resilient fingers, and gently flared in a direction such as to have contact with the said flange of the sealing element only along a zone of relatively narrow width adjacent the said severed margin.

8. Improved sealing means, as defined by claim 1, of which the resilient means, associated with the flexible sealing element, comprises an element of angular form in cross section such as to adapt it to be assembled with the sealing element with opposed surfaces of the corresponding parts of the two elements in a relatively close relation, the flanges of the sealing element being gently flared in such manner as to have contact with the parts which they are designed to oppose only along zones of narrow width adjacent their free margins and the opposed surfaces of the flanges of the two elements being relatively flared in such manner as to have mutual contact only along zones of relatively narrow width adjacent the free margins of the resilient element.

9. Improved sealing means, as defined by claim 1, of which the resilient means, associated with the flexible sealing element, comprises an element of angular form in cross section such as to adapt it to be assembled with the sealing element with opposed surfaces of the corresponding parts of the two elements in a relatively close relation and with the marginal portions of the resilient element in contact with marginal portions of the sealing element, each of the flanges of the resilient element being severed at spaced intervals along its free margin to increase its flexibility.

10. An improved means for sealing an annular orifice between opposed parts of two relatively rotatable machine elements, comprising an outwardly directed, circular surface portion of one of said elements and a surrounding, concentrically disposed, inwardly directed, circular channeled portion of the other; the said sealing means comprising a floating assembly of elements including a flexible sealing ring of angular form in cross section having one of its flanges adapted to surround and be yieldably held in frictional contact with a surface portion of the inner machine element and its other flange adapted to be held in sliding contact with one of the two inner, oppositely disposed surfaces of the channel; a resilient ring of angular cross-sectional form approximating that of the inner surface of the flexible sealing ring and held flexed with its flanges lying respectively along the inner surfaces of the flanges of that element and with their marginal portions in yielding contact with the marginal portions thereof; a rigid shoe adapted to be held in sliding contact with the other of the said oppositely disposed surfaces of the channel, the three said elements of the assembly being of forms and dimensions such that the shoe will be spaced from the sealing ring and its associated resilient ring by an intervening crevice having opposed walls each inclined towards the other so as to gradually diminish its breadth at increasing distances from the closed base wall of the channel; and a garter spring in the crevice of such normal dimensions as to be held under tension in contact with its inwardly flaring walls and be urged in the direction of its gradually decreasing breadth so as to thereby tend to move the shoe and the flexible ring of the assembly away from each other and maintain them in snug sliding contact with the opposing inner surfaces of the channel.

11. Improved sealing means, as defined by claim 10, of which one of the flanges of the resilient ring which is associated with the sealing ring is of relative dimensions such as to be interposed between the garter spring and the adjacent flange of the sealing ring, whereby the garter spring may serve as a means for maintaining the sealing ring and its associated resilient ring in their assembled relation.

12. Improved sealing means, as defined by claim 10, of which the flange of the sealing ring which is adapted to lie along the surface of the machine element which it is designed to surround, is offset so as to have contact with the said surface only along an annular zone of relatively narrow width adjacent the free margin of the flange.

13. Improved sealing means, as defined by claim 10, of which the flange of the resilient ring, associated with the flange of the sealing ring which is adapted to be opposed by a surface of the channel, is gently flared in a direction such as to have contact with the said flange of the sealing element only along an annular zone of relatively narrow width adjacent its margin and serve as one of the flaring walls of the crevice between the shoe and the sealing ring.

14. Improved sealing means, as defined by claim 10, of which the flange of the resilient ring, which is associated with that flange of the sealing ring adapted to be opposed by the machine element which it is designed to surround, is severed at spaced intervals along its free margin to form a succession of resilient fingers, and gently flared in a direction such as to have contact with the associated flange of the sealing ring only along an annular zone of relatively narrow width adjacent the said severed margin.

15. In combination, a flexible sealing ring adapted to close an annular orifice between a pair of relatively movable machine elements, said ring being of angular cross-sectional form such as to provide an approximately cylindrical flange having an outwardly directed approximately plane flange along one of its margins, and a readily detachable, resilient ring of angular cross-sectional form nested in the re-entrant angle of the sealing ring with its respective flanges in a close, approximately parallel relationship with the opposed surfaces of the corresponding flanges of the sealing ring, the flanges of the sealing ring being extended slightly beyond the free margins of the flanges of the resilient ring and provided with shoulders disposed in abutting relations with respect to the margins of the resilient ring so as to hold the two rings in their readily detachable, assembled relation.

16. An assembled sealing ring and resilient ring, as defined by claim 15, of which the approximately cylindrical flange of the sealing ring is gently flared inwardly toward its free margin and of which its outwardly directed flange is so flared as to slightly dish the surface of the sealing ring which faces in a direction opposite to that of the extension of its approximately cylindrical flange.

17. An assembled sealing ring and resilient ring, as defined by claim 15, of which the degree of angularity of the resilient ring is slightly greater than that of the sealing ring, the angularity of each being considered with reference to its re-entrant angle, so that the opposed flanges of the assembled rings will be in mutual contact only along zones of relatively narrow width adjacent the free margins of the resilient ring.

18. An assembled sealing ring and resilient ring, as defined by claim 15, of which the sealing ring has an annular groove in its re-entrant surface extending about the angular junction between its two flanges to increase the flexibility of each of its flanges with respect to the other.

19. An assembled sealing ring and resilient ring, as defined by claim 15, of which the flanges of the resilient ring are severed at spaced intervals along their free margins to increase their flexibility.

CECIL R. HUBBARD.